UNITED STATES PATENT OFFICE 1,923,237

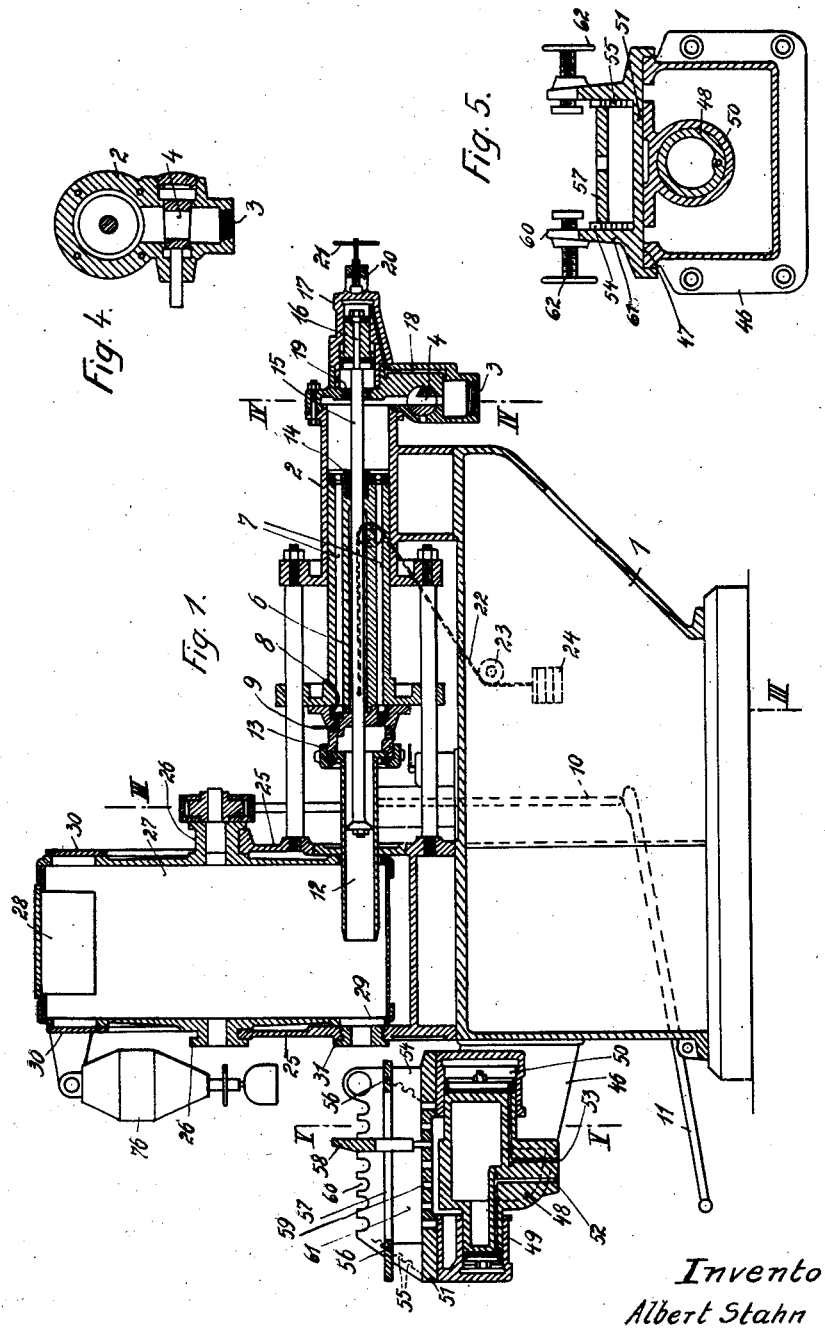
Aug. 22, 1933.   A. STAHN ET AL   1,923,237
MOLD AND CORE MAKING
Filed July 31, 1930   5 Sheets-Sheet 1
Inventors
Albert Stahn
and Bruno Berghaus
Atty.

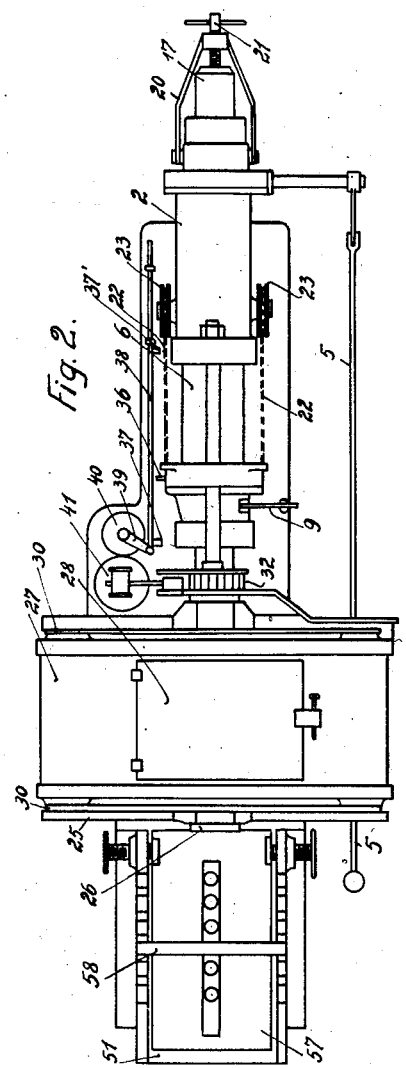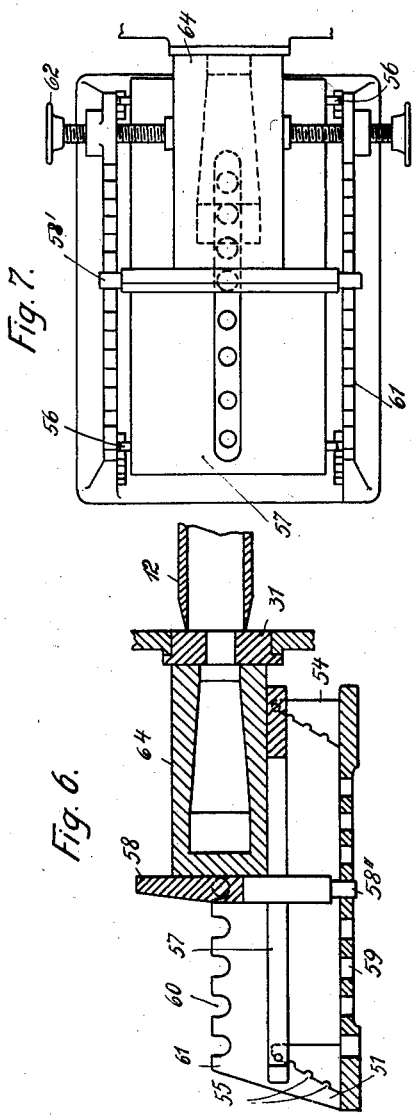

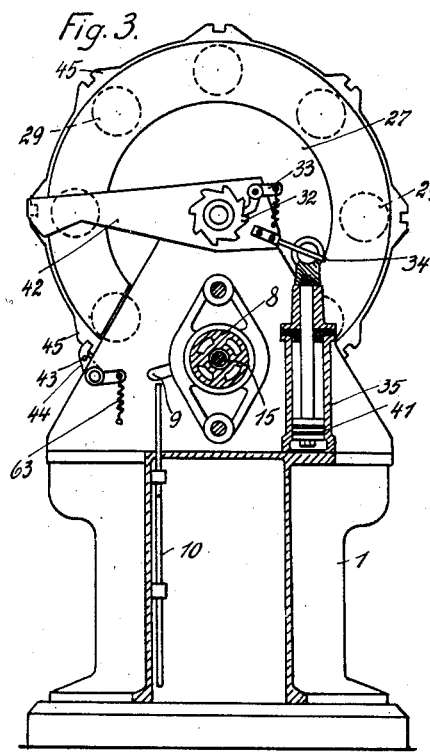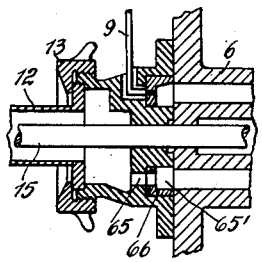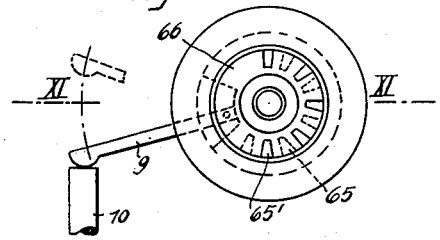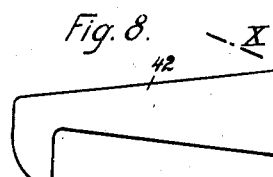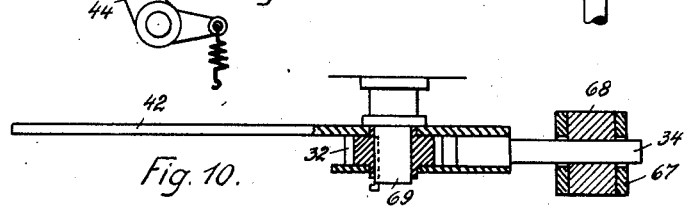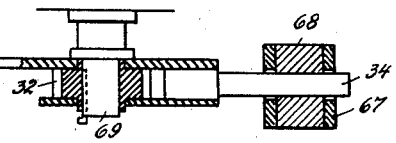

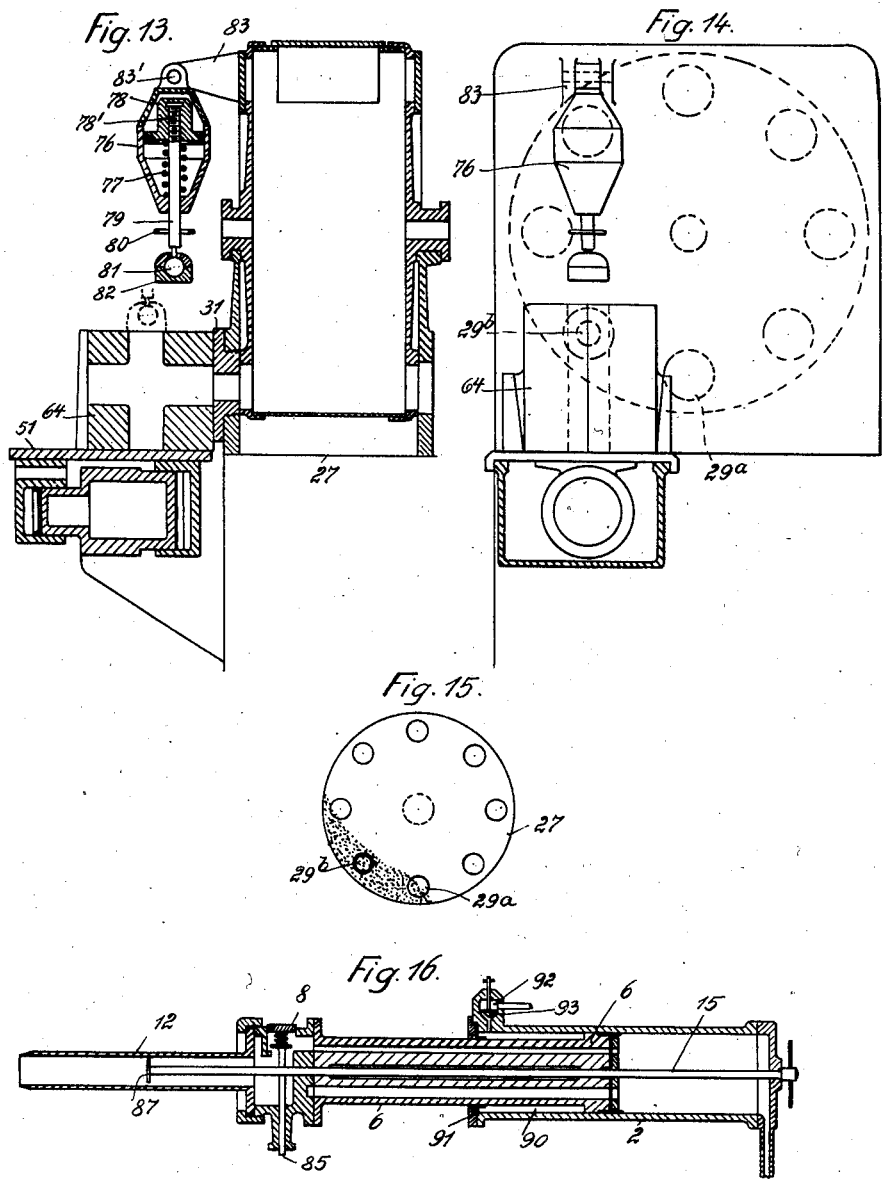

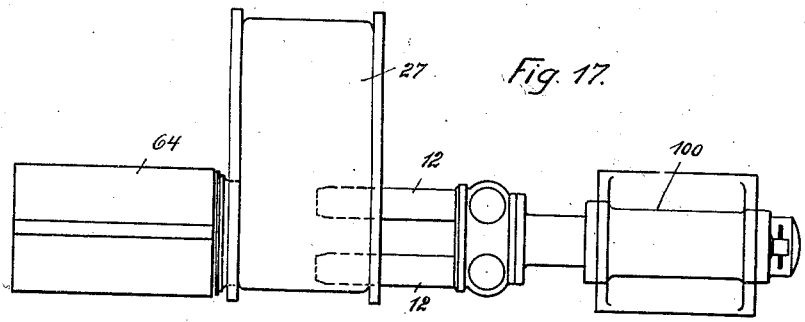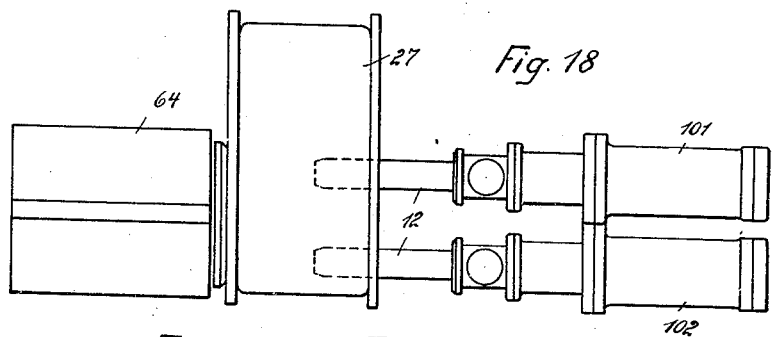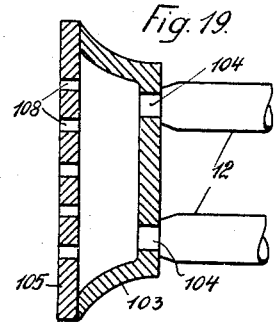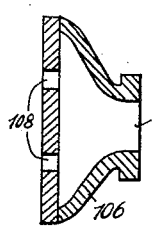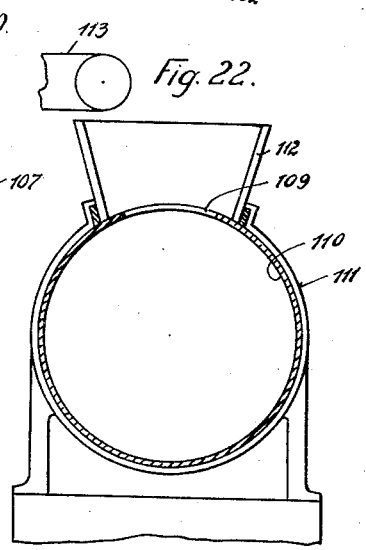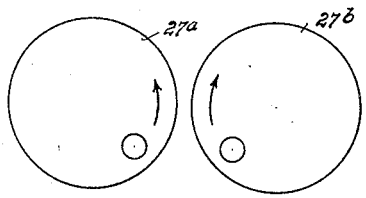

MOLD AND CORE MAKING

Albert Stahn and Bruno Berghaus, Hanover, Germany, assignors to Albertuswerke Gesellschaft mit beschrankter Haftung, Hanover-Hainholz, Germany Application July 31, 1930, Serial No. 471,969, and in Germany July 31, 1929

18 Claims. (Cl. 22—36)

Our invention refers to the art of mold and core making and more especially to the production of sand molds and cores and has for one of its objects to provide means whereby such molds and quite especially cores of complicated design can be produced in a very simple manner and on a mass production scale.

Our invention is particularly applicable to molding machines in which the introduction of the molding material, such as sand or the like, into the flask or core box is effected by means of compressed air. In machines of this type, in which compressed air is used for throwing the sand into the flask or core box the sand mixes with air either before or after being introduced, so that a mixture of sand and air enters the flask or core box, from which the air must be able to escape before the mold or core has attained the necessary degree of solidity and strength.

In contradistinction thereto we shoot the sand into the flask or core box in the form of a coherent body forming a solid jet or column in which substantially no air is admixed to the sand.

We prefer imparting to the sand the acceleration required for introduction into the flask or core box by means of elastic pressure, compressed air being made to act, after the manner of an elastic piston, on one end face of the sand column and thus shooting this column by instantaneous action through a nozzle into the flask or core box. Such instantaneous action can only be obtained by means of compressed gas which, being weightless, on expanding does not need to be accelerated, as does a solid piston, but acts on the rear face of the column of sand similarly as the gases developed by powder exploding in a gun act on the bullet in the barrel.

The quantity of sand or other molding material to be thus shot into the flask or core box in each individual operation is cut out from a supply of sand, which may suffice for a greater number of molds or cores, by means of a tubular cutter, into which compressed air enters on one side, while the column of sand cut out by and enclosed in the cutter emerges on the other side through a nozzle provided for this purpose, forming a compact solid jet, which partly or totally fills the flask or core box.

The high acceleration imparted by the expanding air to the sand column emerging from the nozzle enables the sand to fill all cavities of the flask or core box and to form a dense firmly coherent body. As no air has entered the flask or core box together with the sand, no means need be provided for the escape of such air.

In the drawings affixed to the specification and forming part thereof, a molding machine embodying our invention is illustrated diagrammatically by way of example.

In the drawings

Fig. 1 is a vertical longitudinal section of the machine,

Fig. 2 is a plan view,

Figs. 3, 4 and 5 are cross sections on the lines III—III, IV—IV and V—V, respectively, in Fig. 1, Figs. 6 and 7 are a longitudinal section and plan view respectively of the flask or core box support, drawn to a larger scale, Fig. 8 is an elevation, partly in section, of the mechanism, drawn to a larger scale, for stepwise rotating the sand reservoir, Fig. 9 illustrates a pawl, cooperating with the reservoir, and Fig. 10 is a longitudinal section on the line X—X in Fig. 8.

Figs. 11 and 12 illustrate the valve admitting compressed air to the tubular cutter, Fig. 11 being an axial section on the line XI—XI in Fig. 12, while Fig. 12 is an end view.

Fig. 13 is a vertical axial section showing the means for clamping the flask or core box in position and for closing all apertures excepting the one, through which the sand is introduced.

Fig. 14 is an elevation showing the flask or core box and its support in a position relative to the reservoir, which differs from the position shown in Figs. 1 and 13.

Fig. 15 is a diagrammatic showing of the sand reservoir drawn to a smaller scale.

Fig. 16 is an axial section of a modified form of the cutter operating mechanism.

Fig. 17 is a diagrammatic plan view of a modification.

Fig. 18 is a diagrammatic plan view of a further modification.

Fig. 19 is a sectional view of a nozzle adapted for use with the devices of Figs. 17 and 18.

Fig. 20 is a sectional view of a modified form of nozzle.

Fig. 21 is a diagrammatic showing of a modified form of sand reservoir, and

Fig. 22 is a sectional view of a further modification of the sand reservoir.

Referring to the drawings and first to Figs. 1 and 2, 27 is the sand reservoir having the form of a drum with journals 26 mounted for rotation about a horizontal axis in standards 25 resting on the hollow base 1. 28 is a removable cover closing the filling opening of the drum, in which the sand is thus secured against contact with the outer air, so that premature drying and setting is prevented. The parallel end walls of the drum are formed with a plurality of openings arranged in circles around the axis of rotation, these openings registering in pairs and one of the openings of a pair serving for the introduction of the cutter 12, the other one for the expulsion of the sand into the flask or core box 64. The tubular cutter is shown in Fig. 1 as being introduced halfway into the drum. The circumferential portions of the two parallel walls of the drum are covered with annular plates 30, serving to close the openings 29 in the walls with the only exception of the pair of openings adjoining the cutter and the flask or core box. 31 is an annular nozzle which is exchangeably mounted in front of that opening 29, through which the sand shall be expelled.

The flask or core box 64 (Figs. 6 and 7) is mounted at the left hand end of the machine on a table 51, which is arranged to be displaced horizontally on a gliding surface formed on a support 46 secured to the base 1. The flask or core box 64 does not rest directly on the table 51, but is supported by two plates 57 and 58 (Figs. 1, 2, 6 and 7), which can be adjusted to suit the length and height of the flask or core box. The plate 57 is mounted in horizontal position by means of pins 56 in notches 55 formed in the inclined faces of sockets 45 secured to the table 51. The vertically mounted plate 58 rests with pins 58' in nozzles 60 of the side walls 61 and has a bottom pin 58'' projecting into one of a plurality of holes 59 formed in the table 51. By mounting the plates 57, 58 in one or the other pair of notches the position of the flask or core box 64 can be chosen as required. The flask or core box is fixed in position by means of screw spindles 62 extending across the side walls 61.

Before the flask or core box 64 can be filled with sand it must be firmly applied against the nozzle 31. We effect this by means of a differential piston 48 mounted on the support 46. On one end of the piston is mounted for gliding motion a smaller cylinder 49, on the other end a larger cylinder 50, both being fixed to the plate 51. Between the smaller cylinder 49 and the piston 48 a pressure above normal is maintained by means of a compressed air canal which is constantly supplied with compressed air. In consequence thereof the table 51 always tends to move away from the reservoir 27. In order to apply the flask or core box 64 onto the nozzle 31, compressed air is admitted through the canal 53 into the space enclosed between the piston 48 and the larger cylinder 50, whereby the table 51 is moved towards the reservoir 27, until the flask or core box 64 has applied itself against the nozzle 31.

The flask or core box is frequently provided with several apertures, in order to enable the moulding material to be introduced selectively from one or the other side. When introducing sand, all apertures with the exception of one of them must be closed. Those apertures, which are formed at the bottom, the back and in the sides of the flask or core box, are closed by the table 51 and the plates 57, 58. The top aperture of the flask or core box can be closed by means of a piston illustrated more particularly in Figs. 13 and 14. From a pair of arms 83 projecting from the annular cover plate 30 is suspended a cylinder 76 for rocking motion about a horizontal pin 83'. In the cylinder 76 is disposed a piston 78, which is normally held in its upper end position by means of a spring 77. The piston 78 can be raised and lowered by means of a hand wheel 80. To the bottom end of the spindle 79 is secured by means of a ball bearing 81 a cover plate 82, which serves for closing the top opening of the flask or core box, as shown in dotted lines in Fig. 13. In order to close the opening, after the flask or core box 64 has been mounted in place, the cylinder 76 is rocked so as to carry the end of the spindle vertically above the top opening. By rotating the wheel 80, the spindle is lowered until the top opening is covered by the plate 82. Now compressed air is admitted to the cylinder 76 to force the piston 78 downwardly whereby the plate 82 is forced down upon the top opening of the flask or core box, thereby closing the same, at the same time pressing the flask or core box onto its support.

Fig. 14 is a front view showing the reservoir 27, the flask or core box 64 and the pressure cylinder 76. Here the flask or core box 64, instead of facing the lowermost aperture 29a, is positioned in front of that aperture 29b, which precedes the lowermost aperture in the direction of rotation of the reservoir. (Fig. 15). This arrangement is preferable because on the drum being rotated the sand has the tendency of adhering to that portion of the reservoir which moves upwardly, as shown in Fig. 15. In consequence thereof, as the quantity of sand available in the reservoir diminishes gradually, the cutter, if introduced through the lowermost aperture 29a, would not be filled entirely any more. By arranging the cutter and the flask or core box in front of the pair of apertures 29b, an insufficient filling of the cutter is avoided. After the tubular cutter 12 has been introduced into the reservoir 27, thereby being filled with sand, the sand column in the cutter is forced into the flask or core box through the annular nozzle 31. In the modification illustrated in the drawings the introduction of the cutter 12 into the reservoir 27 as well as the ejection of the sand from the cutter are effected by means of compressd air.

The cutter 12 is shown in Figs. 1 and 2 to be exchangeably mounted on a piston 6 displaceable in horizontal direction in a cylinder 2. Between the piston and the cutter 12 is mounted a valve 8, which will be described further below. The cutter 12 is mounted on the piston 6 by means of a nut 30. The piston 6 is advanced towards the reservoir 27 by means of compressed air admitted into the right hand part of cylinder 2 through a pipe 3 and valve 4 (Figs. 1 and 5). The valve 4 can be operated by means of a rod 5 (Fig. 2) from the front end of the machine carrying the flask or core box support. The piston 6 is pulled back, after the admission of compressed air has been stopped, by a weight 24 attached to the piston by means of a rope or chain 22 passing over a sheave 23.

We may however also provide pneumatic means for pulling the piston back, because, if the pulling back is effected by means of a weight and the valve admitting compressed air to advance the piston is opened of a sudden, the piston might advance with a jerk and might damage the reservoir.

In Fig. 16 are shown pneumatic means for pulling the piston back. Here a chamber 19 is provided between the piston 6 and the cylinder 2, this chamber 90 being packed by means of a stuffing box 91 and communicating with the compressed air canal by means of a conical valve 92, 93. If compressed air is allowed to act of a sudden onto the rear face of the piston, this latter in advancing towards the reservoir 27 will compress the air in the chamber 90. This air being prevented by the valve cone 93 from escaping quickly, a counter pressure will form in the chamber 90, which will cause the advancing speed of the piston to be reduced and the piston to be braked to the extent of preventing damage. The valve 92, 93 allows the pressure to be equalized gradually, so that in spite of the counter pressure formed in the chamber 90 the piston 6 can reach its operating position. In order to pull the piston back, the compressed air acting on its end face is allowed to escape and the pressure in the chamber 90 will then cause the piston to return into its initial position.

On the piston 6 advancing the tubular cutter 12 is introduced into the reservoir 27 through an aperture 29 in the right hand wall of the reservoir and in entering the sand will cut out a column of sand, which now fills the cutter. The cutter advances in the reservoir until its cutting edge meets the annular nozzle 31, which may be made of rubber and serves to pack the cutting edge and the interior of the cutter relative to the interior of the reservoir, thus preventing the compressed air, which will now be admitted into the cutter, from entering the reservoir. If compressed air were admitted into the reservoir, the sand in the reservoir would be strongly compressed and means would have to be provided for restoring it to its former condition.

In the advanced position of the cutter 12 the valve 8 arranged between the cutter and the cylinder 2 is moved into a position in which a rod 10 operable by means of a pedal lever or the like (Figs. 1 and 3) can act from below on a lever 9 operating the valve 8. On depressing pedal lever 11 the rod 10 will push lever 9 (Fig. 12) upwardly into the position shown in dotted lines, whereby the valve disc 66 (Figs. 11 and 12) is angularly displaced so as to bring its apertures 65' into register with apertures 65 in the valve casing 8. Now compressed air can enter from the right hand part of cylinder 2 through large channels 7 extending longitudinally through the piston 6 and can escape through valve 8 into the cutter 12, shooting the sand contained in the cutter in the form of a compact jet or column through the nozzle 31 into the flask or core box 64. The pedal lever 11 and rod 10 are so arranged that the valve 8 can be opened only in that position of the piston, in which the cutting edge of the cutter 12 is firmly applied against the annular nozzle 31.

The inner diameter of the nozzle 31 is chosen in accordance with the inner diameter of the cutter 12 and the size of the flask or core box 64. As a rule it will be smaller in order to favour a sudden forcing in of the sand into the flask or core box 64 and to prevent sand from escaping from the cutter 12 before compressed air has been admitted.

Figs. 2, 3 and 8 to 10 illustrate the mechanism for stepwise rotating the reservoir, whereby the sand in the reservoir is mixed and loosened after each operation so that the formation of cavities in the sand at the point where the cutter 11 enters is prevented. The reservoir 27 is fixed in position during each operation by a pawl 44 acted upon by a spring 63, the pawl 44 entering notches 45 (Figs. 3 and 9) which are distributed on the circumference of the reservoir in a number corresponding to the number and position of the apertures 29. Whenever the piston 6 reaches its advanced position it will release the reservoir 27 by pushing with a nose 36 (Fig. 2) against a check 37, formed on a rod 38, whereby this rod is displaced towards the left, thereby actuating a lever 39 which controls a valve 40. On this valve being opened by the rod 38, compressed air is admitted into a cylinder 35 (Fig. 3) mounted on the base 1. The compressed air acts on a piston 41 reciprocable in the cylinder 35. On the piston rising in this cylinder, a rod 34 extending across a journal 68 rotatable in the head 67 of the piston (Figs. 8 and 10) is lifted and causes an arm 42, loosely mounted on the journal 26 of the reservoir, to be rocked downwardly, this arm meeting a check 43 (Fig. 9) on the pawl 44 and thereby releasing the reservoir 28. At the same time a pawl 33 (Figs. 3, 8 and 10) rotatably secured to the arm 42 is caused to glide on the ratchet wheel 32 fixed to an extension 69 of the journal 26, entering the next succeeding notch of the ratchet wheel. If now the piston 6 is pulled back by the weight 24 or otherwise into its initial position, the nose 36 will meet a check 37' on the rod 38 (Fig. 2), whereby valve 40 is adjusted in such manner that compressed air is admitted to the top end of the cylinder 35, whereby the piston 41 is forced downwardly. In consequence of this the arm 42 is rocked back into its initial position, the pawl 33 carrying along the ratchet wheel 32 and reservoir 27 until pawl 44 has been able to enter the next succeeding notch 45 (Fig. 10). In this manner the reservoir 27 is rotated exactly through that angle which corresponds to the angular distance between two adjoining apertures 29.

In order to remove any residual sand, which may remain over in the tubular cutter 12, a rod 15 extends longitudinally across the piston 6, being packed therein at 14. The rear end of the rod is fixed to a differential piston 16 movably mounted in a cylinder 17. As long as the valve 4 is open, compressed air will act on both end faces of the piston 16 through passages 18 and 19, and the piston 16 is forced to the right. However, as soon as valve 4 has been closed in order to pull the piston 6 and cutter 12 back, the compressed air will act on piston 16 only from the right through passage 18. Now, while the cutter 12 is being pulled back, the piston 16 and rod 15 move in opposite sense, so that the broadened free end of the rod 15 is able to eject the residual sand, which may be contained in the cutter.

In order to enable the cylinder 17, piston 16 and rod 15 to be readily disengaged, for instance if the cutter 12 shall be exchanged, the cylinder 17 is secured to cylinder 2 by means of a strap 20 and screw spindle 21 (Figs. 1 and 2). After releasing the spindle 21, the strap 20 can be removed and the cylinder 17 with piston 16 and rod 15 can be pulled back and the tubular cutter 12 can be exchanged.

In order to be able to fill also very large flasks or core boxes, two or more cutter tubes may be combined for cooperation with a single reservoir for simultaneous or successive action, each cutter tube being introduced through an aperture of its own and each being provided with a separate driving mechanism. Alternatively, a plurality of cutter tubes may be operated simultaneously by one driving mechanism.

If large flasks or core boxes are to be filled, the tube 12 must be operated several times. In order to save time, two or more tubes 12 can be introduced simultaneously into the reservoir 27, these tubes being operated either by a common cylinder 100 (Fig. 17) or each by a cylinder of its own 101, 102 (Fig. 18). In this case the simultaneously operated tubes 12 may cooperate with a common nozzle 103 (Fig. 19) having a separate aperture 102 for each tube and being closed by a perforated plate 105. Each tube 12 may however also cooperate with a separate nozzle 106 (Fig. 20) having a single entrance opening 107. A separate mould or core box can be applied against each opening 108 of a nozzle 103 or 106 and in this case as many mould or core boxes can be filled simultaneously as there are openings in the plate 105. It is however also possible to simultaneously produce by means of such nozzles a plurality of cores in a single core box.

Instead of one reservoir 27 two or more may be provided, as shown in Fig. 21, where two reservoirs 27a, 27b are juxtaposed for rotation in opposite direction, so that tubes 12 can be introduced simultaneously in both reservoirs.

If a plurality of tubes 12 is provided for simultaneous use, the quantity of moulding material consumed per unit of time will become very considerable. In such cases it is advisable to use a reservoir 110 such as shown in Fig. 22 having a permanently open inlet 109 and rotating in a casing 111 provided with a hopper 112, which is continuously supplied with fresh molding material by means of a conveyer 113. Whenever the inlet 109 of the reservoir is in register with the hopper, fresh moulding material will drop into the reservoir, which in all other positions is airtightly enclosed in the casing 111.

In the claims affixed to this specification and forming part thereof the term "molding position" is intended to designate the final position of a sand or other molding material in the flask or core box.

We wish it to be understood that we do not desire to be limited to the exact details of construction shown and described for obvious modifications will occur to a person skilled in the art.

In the claims affixed to this specification and forming part thereof the term "airless" is intended to designate a compound body of sand, in which individual particles are not separated by air, but are in contact with each other.

We claim:—

1. Mold and core making machine comprising a reservoir, rotatable about a substantially horizontal axis, for the reception of a supply of molding material, a hollow cutter, means for introducing said cutter into said reservoir to cut out a coherent body of molding material, and means for shooting such undivided body into molding position.

2. Mold and core making machine comprising a reservoir, rotatable about a substantially horizontal axis, for the reception of a supply of molding material, a hollow cutter, means for introducing said cutter into said reservoir to cut out a coherent body of molding material, and means for shooting such undivided body into molding position in substantially horizontal direction.

3. Mold and core making machine comprising a reservoir for the reception of a supply of molding material, opposite walls of said reservoir being formed with registering apertures, a hollow cutter, means for introducing said cutter into said reservoir through one aperture to cut out a coherent body of molding material and means for shooting said undivided body into molding position through the other aperture in register with the first one.

4. Mold and core making machine comprising a reservoir for the reception of a supply of molding material, opposite walls of said reservoir being formed with registering apertures, a hollow cutter, means for introducing said cutter into said reservoir through one aperture to cut out a body of molding material, means for packing the cutting edge of said cutter relative to the edge of the other aperture, in register with the first one, and means for pushing the contents of said cutter into molding position through said other aperture.

5. Mold and core making machine comprising a rotatable reservoir for the reception of a supply of molding material, opposite walls of said reservoir being formed with a plurality of apertures arranged in registering circles around the axis of rotation, a tubular cutter movable parallel to said axis and in line with a pair of registering apertures, means closing the other apertures, means for moving said cutter through one and into close proximity with the other aperture of said pair, means for packing the cutting edge of said cutter relative to the edge of said other aperture and means for pushing the material contained in said cutter through said other aperture.

6. Mold and core making machine comprising a rotatable reservoir for the reception of a supply of molding material, means for stepwise rotating said reservoir, opposite walls of said reservoir being formed with a plurality of apertures arranged in registering circles around the axis of rotation, a tubular cutter movable parallel to said axis and in line with a pair of registering apertures, means closing the other apertures, means for moving said cutter through one and into close proximity with the other aperture of said pair, means for packing the cutting edge of said cutter relative to the edge of said other aperture, and means for pushing the material contained in said cutter through said other aperture.

7. Mold and core making machine comprising a rotatable reservoir for the reception of a supply of molding material, means for stepwise rotating said reservoir, opposite walls of said reservoir being formed with a plurality of apertures arranged in registering circles around the axis of rotation, a tubular cutter movable parallel to said axis and in line with a pair of registering apertures, means closing the other apertures, means for moving said cutter through one and into close proximity with the other aperture of said pair, means for packing the cutting edge of said cutter relative to the edge of said other aperture, means for pushing the material contained in said cutter through said other aperture, and means actuated by said cutter for actuating said stepwise rotating means.

8. Mold and core making machine comprising a rotatable reservoir for the reception of a supply of molding material, opposite walls of said reservoir being formed with a plurality of apertures arranged in registering circles around the axis of rotation, a tubular cutter movable parallel to said axis and in line with a pair of registering apertures, means closing the other apertures, a piston, actuated by an elastic fluid for moving said cutter through one and into close proximity with the other apertures of said pair, means for packing the cutting edge of said cutter relative to the edge of said other aperture and means for pushing the material contained in said cutter through said other aperture.

9. Mold and core making machine comprising a rotatable reservoir for the reception of a supply of molding material, opposite walls of said reservoir being formed with a plurality of apertures arranged in registering circles around the axis of rotation, a tubular cutter movable parallel to said axis and in line with a pair of registering apertures, means closing the other apertures, a piston, actuated by an elastic fluid and a counter weight for moving said cutter through one and into close proximity with the other aperture of said pair, means for packing the cutting edge of said cutter relative to the edge of said other aperture, and means for pushing the material contained in said cutter through said other aperture.

10. Mold and core making machine comprising a reservoir for the reception of a supply of molding material, a hollow cutter, a reciprocating piston governing said cutter and arranged to introduce same into said reservoir, said piston being formed with a passage and means for injecting compressed air through said passage into said cutter.

11. Mold and core making machine comprising a reservoir for the reception of a supply of molding material, a hollow cutter, a reciprocating piston governing said cutter and arranged to introduce same into said reservoir, said piston being formed with a passage, a valve governing the supply of compressed air to the interior of said cutter through said passage and means for opening said valve near the end of the introduction stroke of said piston and cutter.

12. Mold and core making machine comprising a reservoir for the reception of a supply of molding material, a hollow cutter, a reciprocating piston governing said cutter and arranged to introduce same into said reservoir, said piston being formed with a passage, a valve governing the supply of compressed air to the interior of said cutter through said passage and a pusher rod extending across said valve and said piston into said cutter.

13. Mold and core making machine comprising a reservoir for the reception of a supply of molding material, opposite walls of said reservoir being formed with registering apertures, a hollow cutter, means for introducing said cutter into said reservoir through one aperture to cut out a body of molding material, means for packing the cutting edge of said cutter relative to the edge of the other aperture, in register with the first one, means for pushing the contents of said cutter into molding position through said other aperture, a support adjoining said other aperture, a plate adjustable on said support, a molding box supported by said plate, means for holding said molding box applied against said other aperture, and means for pushing the contents of said cutter through said other aperture into said molding box.

14. Mold and core making machine comprising a reservoir for the reception of a supply of molding material, opposite walls of said reservoir being formed with registering apertures, a hollow cutter, means for introducing said cutter into said reservoir through one aperture to cut out a body of molding material, means for packing the cutting edge of said cutter relative to the edge of the other aperture, in register with the first one, means for pushing the contents of said cutter into molding position through said other aperture, a support adjoining said other aperture, a plate adjustable on said support, a molding box supported by said plate, means for holding said molding box applied against said other aperture, means for pushing the contents of said cutter through said other aperture into said molding box, and a clamping means forcing said box down upon its support and closing its top aperture.

15. Mold and core making machine comprising a reservoir for the reception of a supply of molding material, opposite walls of said reservoir being formed with registering apertures, a hollow cutter, means for introducing said cutter into said reservoir through one aperture to cut out a body of molding material, means for packing the cutting edge of said cutter relative to the edge of the other aperture in register with the first one, means for pushing the contents of said cutter into molding position through said other aperture, a support adjoining said other aperture, a plate adjustable on said support, a molding box supported by said plate, means for holding said molding box applied against said other aperture, means for pushing the contents of said cutter through said other aperture into said molding box, a cylinder rockably mounted above said box and a piston movable in said cylinder and arranged to force said box down upon its support and closing its top aperture.

16. Mold and core making machine comprising a rotatable reservoir for the reception of a supply of molding material, opposite walls of said reservoir being formed with a plurality of apertures arranged in registering circles around the axis of rotation, a tubular cutter movable parallel to said axis and in line with a pair of registering apertures, means closing the other apertures, means for moving said cutter through one and into close proximity with the other aperture of said pair, means for packing the cutting edge of said cutter relative to the edge of said other aperture, means for pushing the material contained in said cutter through said other aperture, and a molding box adjoining said other aperture, said cutter and said molding box being arranged in line with that pair of registering apertures which precedes the lowermost pair of apertures in the direction of rotation of said reservoir.

17. Mold and core blowing machine comprising a reservoir for the molding material, a hollow cutter, power driven means for axially moving said cutter into said reservoir to cut out a column of molding material therein and means for admitting a compressed gas into the hollow of said cutter, while said column is enclosed therein so as to expel said column in axial direction into a mold or core box.

18. Mold and core blowing machine comprising a reservoir for the molding material, a hollow cutter, pneumatic means for axially moving said cutter into said reservoir to cut out a column of molding material therein and means for admitting a compressed gas into the hollow of said cutter, while said column is enclosed therein, so as to expel said column in axial direction into a mold or core box.

ALBERT STAHN.
BRUNO BERGHAUS.